United States Patent
Kasuya et al.

(10) Patent No.: US 12,401,678 B2
(45) Date of Patent: Aug. 26, 2025

(54) COMPUTER SYSTEM AND ANALYSIS METHOD FOR IMPACT OF SECURITY RISK

(71) Applicant: Hitachi, Ltd., Tokyo (JP)

(72) Inventors: Momoka Kasuya, Tokyo (JP); Hiroki Yamazaki, Tokyo (JP); Makoto Kayashima, Tokyo (JP); Yasuhiko Nagai, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 18/685,322

(22) PCT Filed: Sep. 7, 2022

(86) PCT No.: PCT/JP2022/033569
§ 371 (c)(1),
(2) Date: Feb. 21, 2024

(87) PCT Pub. No.: WO2023/149008
PCT Pub. Date: Aug. 10, 2023

(65) Prior Publication Data
US 2024/0396923 A1    Nov. 28, 2024

(30) Foreign Application Priority Data
Feb. 1, 2022    (JP) .................................. 2022-013973

(51) Int. Cl.
*H04L 9/40*    (2022.01)
(52) U.S. Cl.
CPC ................................ *H04L 63/1433* (2013.01)
(58) Field of Classification Search
CPC .... H04L 63/1433; G06Q 50/40; G06Q 50/04; G06Q 10/0635; G06F 21/577
See application file for complete search history.

(56) References Cited

U.S. PATENT DOCUMENTS

| | | | |
|---|---|---|---|
| 9,418,222 B1 * | 8/2016 | Rivera | G06F 21/554 |
| 12,147,925 B1 * | 11/2024 | R | G06Q 10/06393 |

(Continued)

FOREIGN PATENT DOCUMENTS

| | | | | |
|---|---|---|---|---|
| CN | 109688159 A | * | 4/2019 | H04L 63/10 |
| CN | 113268738 A | * | 8/2021 | G06F 21/64 |

(Continued)

OTHER PUBLICATIONS

Chen et al. WO 2019/163266 A1. English translation. (Year: 2019).*

(Continued)

*Primary Examiner* — Sarah Su
(74) *Attorney, Agent, or Firm* — PROCOPIO, CORY, HARGREAVES & SAVITCH LLP

(57) ABSTRACT

A computer system holds: function information for managing functions of modules which form a product; resource information for managing a resource which implements a function of components that forms each of the modules; and product configuration system information for managing a system of the modules and relationships between the modules and the components. The computer system obtains cyber security information on a target resource having a security risk, identifies, based on the resource information, a target component provided with a target function implemented through use of the target resource; identifies, based on the product configuration system information and the function information, a target module provided with the target function with a starting point being set to one of the modules which is provided with the target component, identifies, based on the product configuration system information, each of the components which relates to the target module; and generates impact range information for presenting the each of the components which has been identified.

6 Claims, 8 Drawing Sheets

| 401 | 402 | 400 |
|---|---|---|
| CLASS NAME | CLASS NAME (PARENT) | |
| CENTER COORDINATION SERVICE-SYSTEM ECU | INFORMATION-SYSTEM ECU | |
| INFORMATION-SYSTEM ECU | ECU WITH SECURE BOOT FUNCTION | |
| INFORMATION-SYSTEM ECU | Ethernet CONNECTION ECU | |
| ⋮ | ⋮ | |
| TCU | CENTER COORDINATION SERVICE-SYSTEM ECU | |
| ⋮ | ⋮ | |

(56) References Cited

U.S. PATENT DOCUMENTS

| | | | | |
|---|---|---|---|---|
| 2022/0207140 A1* | 6/2022 | Mooney, III | .......... | G06F 21/577 |
| 2023/0351027 A1* | 11/2023 | Salji | ............ | G06F 21/554 |
| 2025/0023918 A1* | 1/2025 | Sethi | ............ | H04L 63/20 |

FOREIGN PATENT DOCUMENTS

| | | | | | |
|---|---|---|---|---|---|
| CN | 113837548 | A | * 12/2021 | ............. | G06N 3/045 |
| CN | 115186136 | A | * 10/2022 | ......... | H04L 63/1416 |
| CN | 118552216 | A | * 8/2024 | ......... | G06F 16/2474 |
| EP | 4475064 | A1 | * 12/2024 | ......... | G06Q 10/0635 |
| JP | 2010-067216 | A | 3/2010 | | |
| KR | 20200001453 | A | * 1/2020 | ........... | G06F 21/577 |
| RU | 2713574 | C1 | * 2/2020 | ............. | G06Q 10/06 |
| WO | WO-2019163266 | A1 | * 8/2019 | ............. | G06F 21/57 |
| WO | WO-2019163972 | A1 | * 8/2019 | ............... | G06N 7/01 |
| WO | WO-2023149008 | A1 | * 8/2023 | ......... | G06Q 10/0635 |

OTHER PUBLICATIONS

International Search Report, with translation, and Written Opinion received in co-pending International Application No. PCT/JP2022/033569, mailed Nov. 22, 2022, in 8 pages.

* cited by examiner

| CLASS NAME | FUNCTION |
| --- | --- |
| Ethernet CONNECTION ECU | Ethernet COMMUNICATION FUNCTION (TP/NW LAYER) |
| Ethernet CONNECTION ECU | Ethernet COMMUNICATION FUNCTION (DL LAYER) |
| Ethernet CONNECTION ECU | Ethernet COMMUNICATION FUNCTION (PHYSICAL LAYER) |
| INFORMATION-SYSTEM ECU | INFORMATION-SYSTEM MICROCOMPUTER |
| ⋮ | ⋮ |
| TCU | EMERGENCY CALL FUNCTION |
| ⋮ | ⋮ |

FIG. 5

COMPUTER SYSTEM AND ANALYSIS METHOD FOR IMPACT OF SECURITY RISK

INCORPORATION BY REFERENCE

This application claims priority to Japanese Patent Application No. 2022-13973 filed on Feb. 1, 2022, the content of which is incorporated herein by reference.

BACKGROUND OF THE INVENTION

This invention relates to a system and a method which determine an impact of a disclosed security risk on a product.

In recent years, importance of countermeasures against cyber attacks has increased. For example, in ISO 21434 being an international standard relating to cyber security for vehicles, long-term cyber security policies are required more as digitization of control systems for vehicles progresses.

In the cyber security policies, it is required to collect cyber security information on security risks such as vulnerability and threat, identify elements to be subjected to an impact of the security risks, and take countermeasures thereagainst. For this purpose, there is known a technology as described in JP 2010-67216 A.

In JP 2010-67216 A, there is a description "In a vulnerability determination device 40, after a vulnerability information obtaining module 41 obtains vulnerability information from a vulnerability information disclosure site device 30 and writes the vulnerability information into a vulnerability information storage 42 and a configuration information request module 43 obtains the configuration information from an electronic computer $20_1$ and writes the configuration information into a configuration information storage unit 44, a matching module 45 determines whether or not the configuration information in the configuration information storage unit 44 has relevance to the vulnerability information in the vulnerability information storage 42, and as a result of the determination performed by the matching module 45, an impact degree determination module 46 determines whether or not the configuration information having relevance to the vulnerability information has relevance to service setting information obtained from the electronic computer $20_1$, and as a result of the determination, outputs the configuration information having relevance to the service setting information."

SUMMARY OF THE INVENTION

Manufacturers procure various components which form vehicles from suppliers, to thereby manufacture vehicles. Thus, there are cases in which a manufacturer cannot recognize detailed specifications of a component. It is conceivable to obtain information such as specifications on the component from a supplier, but there are cases in which a supplier refuses to provide the information from the viewpoint of security and the like.

In the related art, it is required to completely recognize configuration information on a product such as a vehicle. Therefore, in a case where the configuration information on the product is incomplete, the product may fail to correctly function.

This invention has an object to achieve a system and a method for accurately estimating a component which may be subjected to an impact of a security risk even when configuration information on a product is incomplete.

A representative example of the present invention disclosed in this specification is as follows: a computer system comprises at least one computer including a processor and a storage device and holds function information for managing function of each of a plurality of modules which form a product, resource information for managing a resource which implements the function of each of a plurality of components that form a module, and product configuration system information for managing a system of the plurality of modules and relationships between the plurality of modules and the plurality of components. The function information stores only data relating to some of the plurality of components, or data relating to at least one of the plurality of components is incomplete. The at least one computer is configured to: obtain cyber security information on a target resource having a security risk; identify, based on the resource information, a target component provided with a target function implemented through use of the target resource; identify, based on the product configuration system information and the function information, a target module provided with the target function with a starting point being set to one of the plurality of modules which is provided with the target component; identify, based on the product configuration system information, each of the plurality of components which relates to the target module; and generate and output impact range information for presenting the each of the plurality of components which has been identified.

According to the at least one embodiment of this invention, it is possible to accurately estimate the component which may be subjected to the impact of the security risk even when the configuration information on the product is incomplete. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 5 is a table for showing an example of function management information in the first embodiment;

DETAILED DESCRIPTION OF THE PREFERRED EMBODIMENTS

Figure 1:
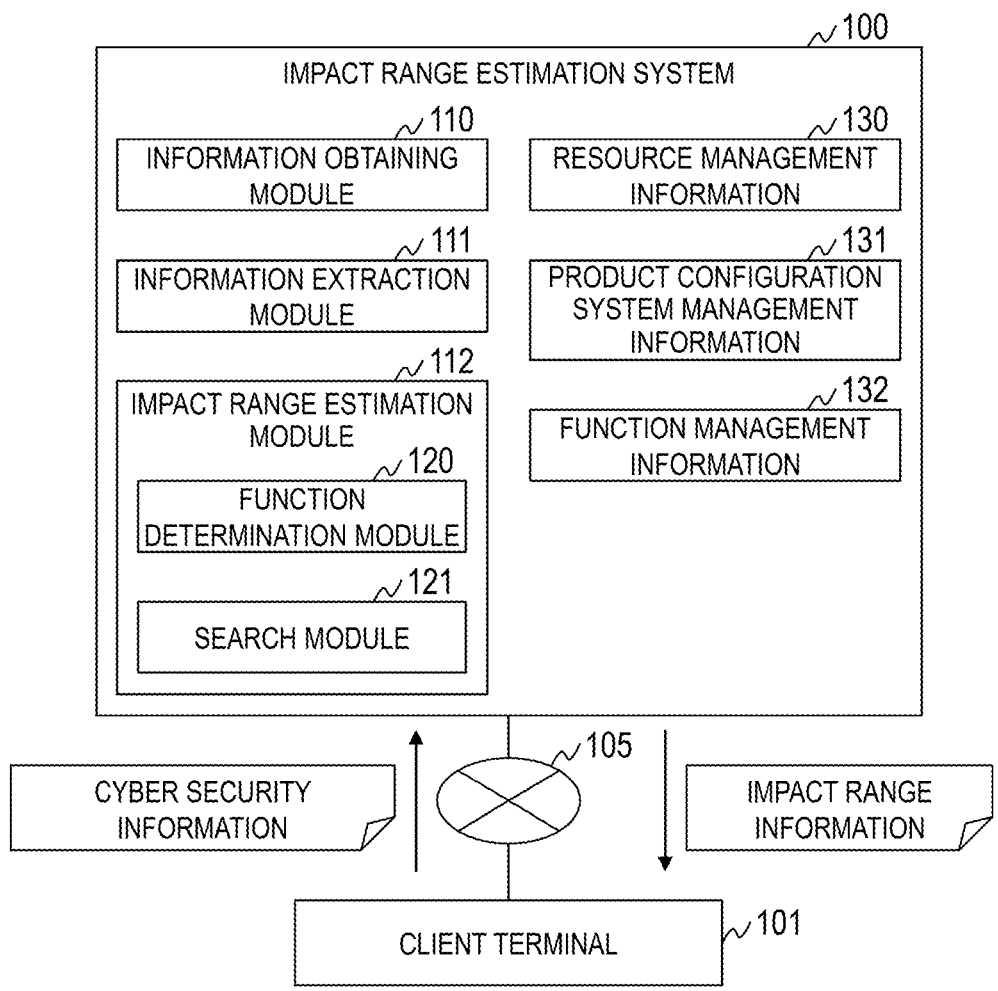
FIG. 1 is a diagram for illustrating a configuration example of a system according to a first embodiment.

Now, description is given of at least one embodiment of this invention referring to the drawings. It should be noted that this invention is not to be construed by limiting the invention to the content described in the following at least one embodiment. A person skilled in the art would easily recognize that specific configurations described in the following at least one embodiment may be changed within the scope of the concept and the gist of this invention.

In configurations of the at least one embodiment of this invention described below, the same or similar components or functions are denoted by the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and others in order to facilitate understanding of this invention. Thus, this invention is not limited to the position, size, shape, range, and others disclosed in, for example, the drawings.

In this specification, a product is assumed to be formed of a module group which implements various functions included in the product. Moreover, a module is assumed to be formed of one or more components. When a vehicle is a product, examples of the module include an in-vehicle ECU, and examples of the components includes an MPU and a TCU.

First Embodiment

Figure 2:
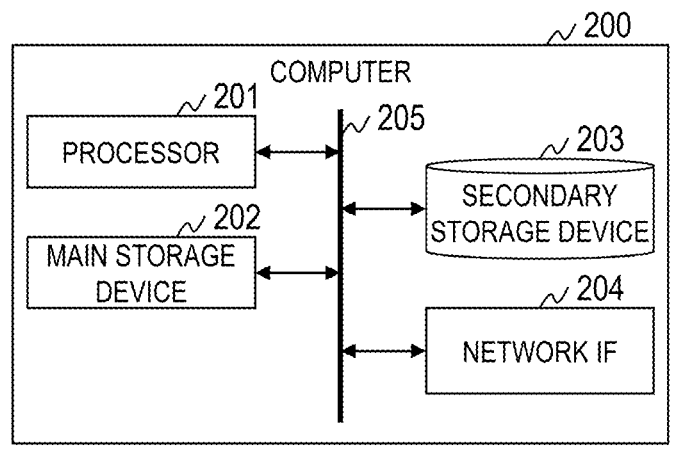
FIG. 2 is a diagram for illustrating a configuration example of a computer which forms an impact range estimation system according to the first embodiment.

FIG. 1 is a diagram for illustrating a configuration example of a system according to a first embodiment of this invention. FIG. 2 is a diagram for illustrating a configuration example of a computer which forms an impact range estimation system according to the first embodiment.

The system includes an impact range estimation system 100 and a client terminal 101. The number of client terminals 101 may be two or more. The impact range estimation system 100 and the client terminal 101 are connected to each other through a network 105. The network 105 is, for example, a wide area network (WAN) or a local area network (LAN), and a connection method may be any one of a wired manner or a wireless manner.

The client terminal 101 transmits, to the impact range estimation system 100, cyber security information in which a security risk of a resource which implements any function is described. In this case, the resource is a concept including software and hardware. Moreover, the cyber security information is information including a character string. The impact range estimation system 100 identifies modules and components which are to be subjected to an impact of the security risk of the resource, and outputs the modules and the components to the client terminal 101 as impact range information.

The client terminal 101 is a terminal which is operated by a manufacturer that manufactures a product, a vendor that sells a product, or the like, and is, for example, a general-purpose computer or a smartphone.

The impact range estimation system 100 determines an impact range of a product regarding an impact of a security risk to be exerted on the product. In this case, the impact range of the product means a component group to be subjected to the impact of the security risk among components (elements) which form the product. The impact range estimation system 100 is formed of a computer 200 of FIG. 2. The number of computers 200 which form the impact range estimation system 100 may be one, or two or more.

The computer 200 includes a processor 201, a main storage device 202, a secondary storage device 203, and a network interface 204. The hardware elements are connected to each other through an internal bus 205.

The processor 201 executes a program stored in the main storage device 202. The processor 201 executes processing in accordance with the program, to thereby operate as a function module (module) for implementing a specific function. In the following description, when the processing is described with a function module as the subject, the description indicates that the processor 201 is executing the program for implementing the function module.

The main storage device 202 is a dynamic random access memory (DRAM), and stores programs to be executed by the processor 201 and data to be used by the programs. The main storage device 202 is also used as a work area.

The secondary storage device 203 is a hard disk drive (HDD), a solid state drive (SSD), or the like, and permanently stores data. The programs and data stored in the main storage device 202 may be stored in the secondary storage device 203. In this case, the processor 201 reads out the programs and information from the secondary storage device 203, and loads the programs and information onto the main storage device 202.

The network interface 204 is an interface for connection to an external device through a network.

Such a hardware configuration of the computer 200 is merely an example, and this invention is not limited thereto. The computer 200 may include input devices such as a keyboard, a mouse, and a touch panel, or may include output devices such as a display and a printer.

The impact range estimation system 100 includes, as function modules, an information obtaining module 110, an information extraction module 111, and an impact range estimation module 112. The impact range estimation system 100 also holds resource management information 130, product configuration system management information 131, and function management information 132.

The resource management information 130 is information for managing functions of components and resources for implementing the functions. The product configuration system management information 131 stores information for systematically managing relationships between modules and components. The function management information 132 is information for managing functions provided to the modules and the components.

The information obtaining module 110 obtains cyber security information. The information extraction module 111 extracts information on a resource serving as a subject of a security risk from the cyber security information. For example, names of software having vulnerability, details of the vulnerability, and the like are extracted. The information extraction module 111 further generates a search key from the extracted information, and outputs the search key to the impact range estimation module 112. The impact range estimation module 112 estimates an impact range of a product based on the search key, and outputs a result of the estimation as impact range information. The impact range estimation module 112 includes a function determination module 120 and a search module 121.

Regarding the respective function modules of the impact range estimation system 100, a plurality of function modules may be combined into one function module, or one function module may be divided into a plurality of function modules each corresponding to a relevant function.

Figure 3:
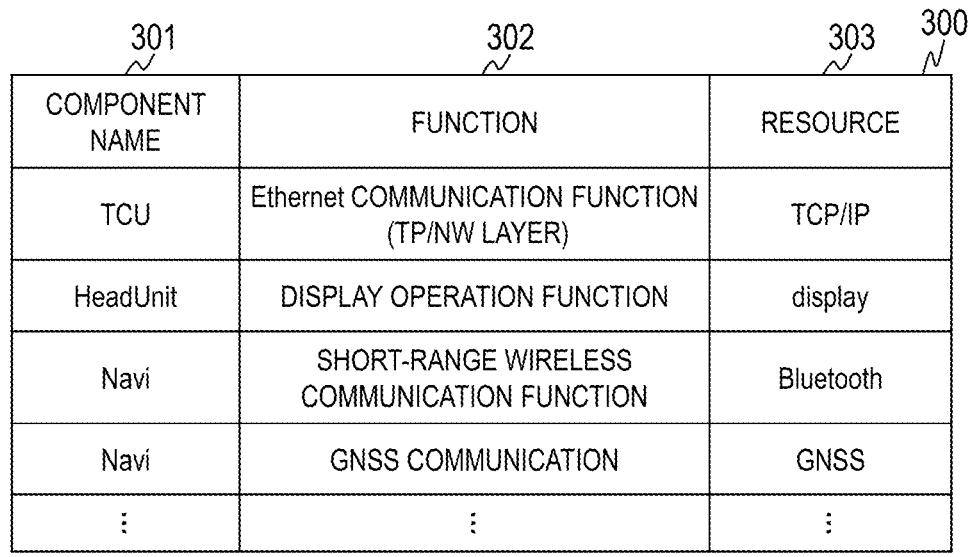
FIG. 3 is a table for showing an example of resource management information in the first embodiment.

FIG. 3 is a table for showing an example of the resource management information in the first embodiment.

In the resource management information 130, resource information 300 is stored for each product. The resource information 300 stores entries each including a component name 301, a function 302, and a resource 303.

The component name 301 is a field for storing a name (identification information) of a component. The function 302 is a field for storing a function included in the component. The resource 303 is a field for storing a resource for implementing the function.

Figure 4:
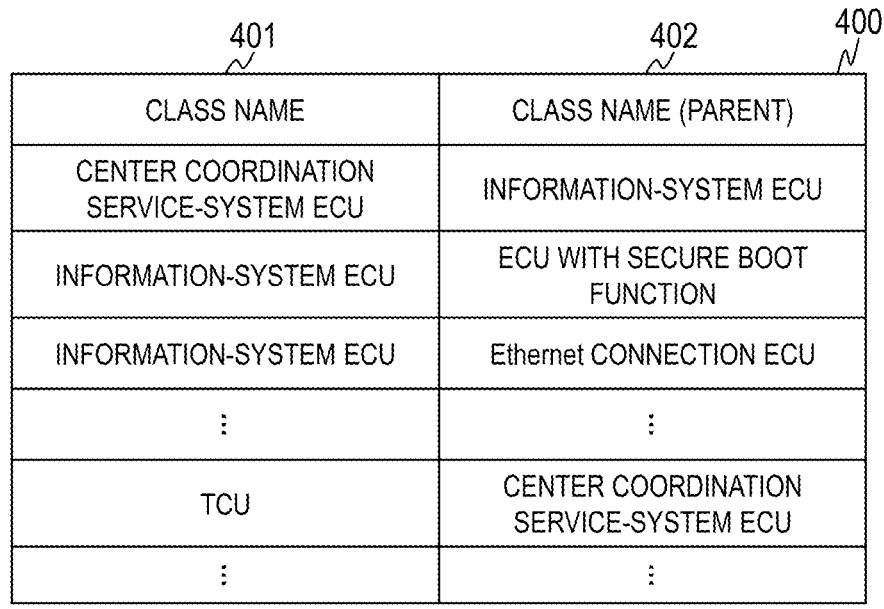
FIG. 4 is a table for showing an example of product configuration system management information in the first embodiment.

FIG. 4 is a table for showing an example of the product configuration system management information 131 in the first embodiment.

In the product configuration system management information 131, one or more pieces of product configuration system information 400 are stored. The product configuration system information 400 stores entries each including a class name 401 and a class name (parent) 402.

The class name 401 and the class name (parent) 402 are fields for storing names (identification information) of a module or a component. The module or the component in the class name 401 means a module or a component at a lower hierarchical level than that of the module or the component in the class name (parent) 402.

FIG. 5 is a table for showing an example of the function management information in the first embodiment.

In the function management information 132, function information 500 is stored for each product. The function information 500 stores entries each including a class name 501 and a function 502.

The class name 501 is a field for storing names (identification information) of a module or a component. The function 502 is a field for storing a function provided to the module or the component.

Only entries of modules may be stored in the function management information 132.

Figure 6:
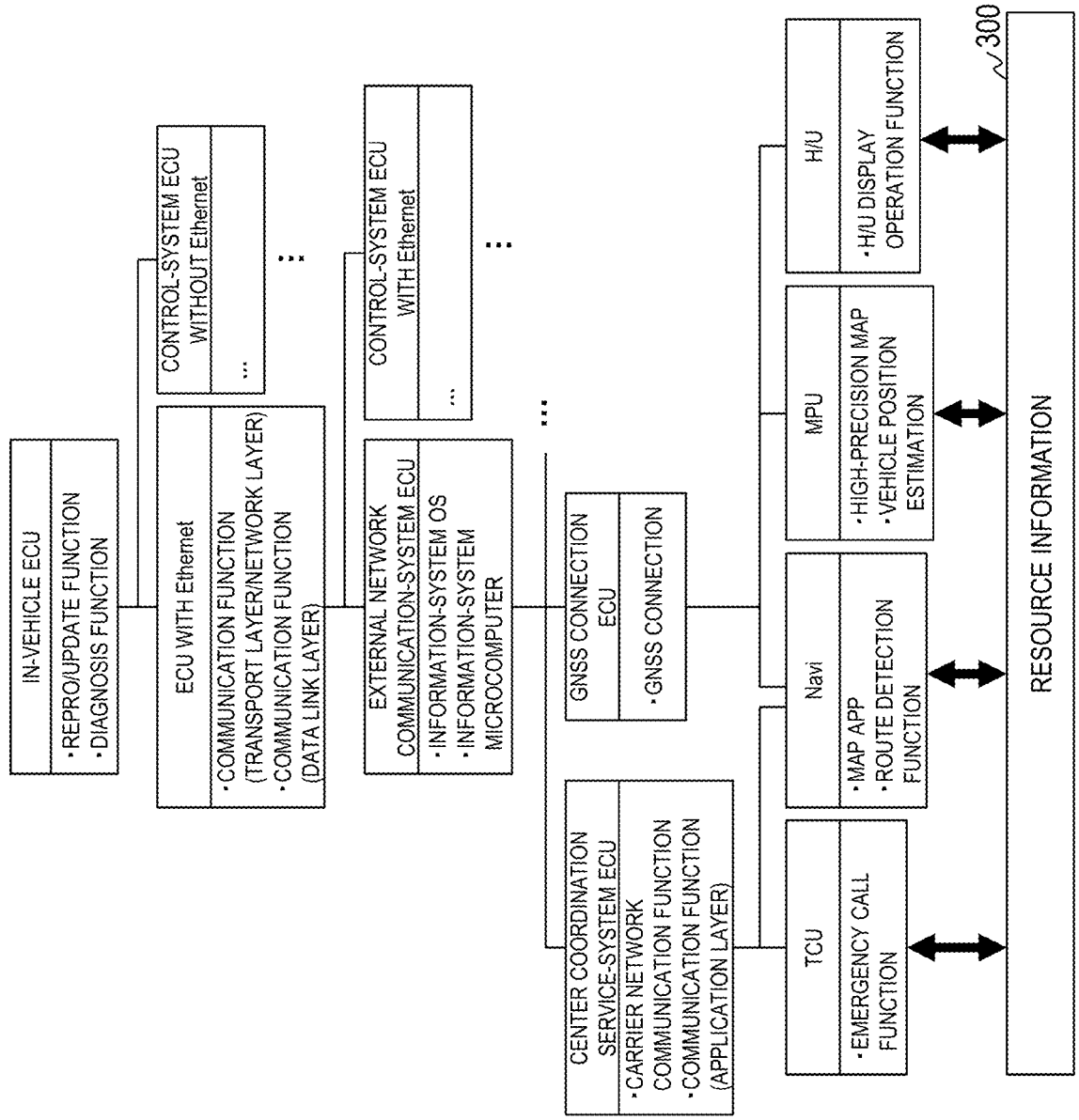
FIG. 6 is a diagram for illustrating an image of information managed by the impact range estimation system according to the first embodiment.

FIG. 6 is a diagram for illustrating an image of information managed by the impact range estimation system 100 according to the first embodiment.

In this embodiment, in order to systematically manage modules and components, a data format in which each module and each component are treated as object-oriented classes is employed. As illustrated in FIG. 6, the product configuration system information 400 and the function information 500 are information indicating a tree structure in which functions corresponding to object-oriented attributes are set for classes and the respective classes are connected in inheritance relationships. The classes corresponding to the components become leaf nodes of the tree structure. The class corresponding to the component is associated with the resource information 300.

In the related art, the resource information is required to store information on all the components. In a case where the resource information 300 does not store the data on all the components, the impact range estimation system 100 according to this embodiment estimates components to be subjected to an impact through use of the information having the tree structure of FIG. 6. In this case, a state in which the resource information 300 does not store the data on all the components means a state in which only data relating to some of the components is stored or a state in which data relating to at least one of the components is incomplete.

Figures 7, 8A:
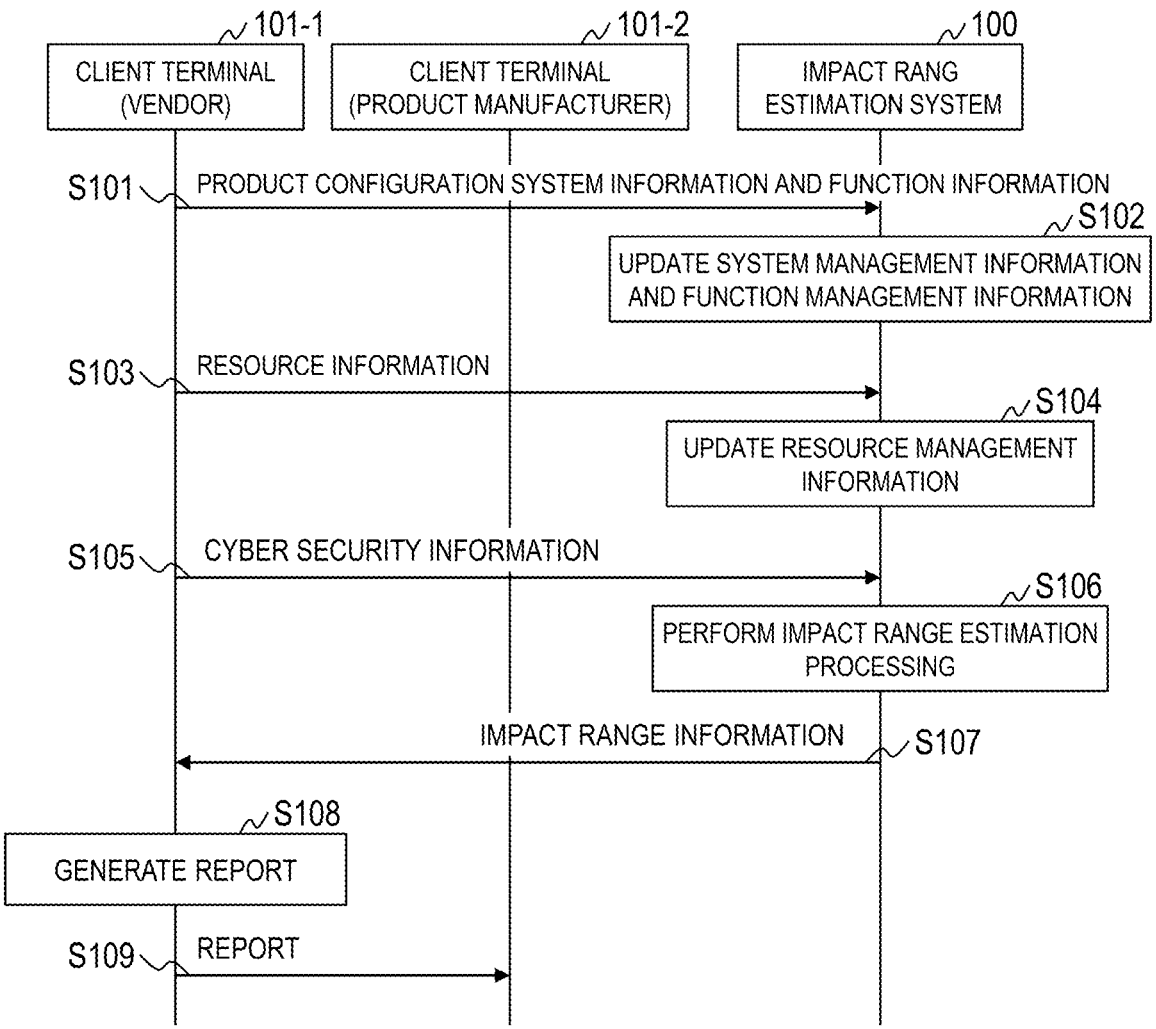
FIG. 7 is a table for showing an example of impact range information in the first embodiment.
FIG. 8A, FIG. 8B, and FIG. 8C are sequence diagrams for illustrating examples of processing flows of the system according to the first embodiment.

FIG. 7 is a table for showing an example of the impact range information in the first embodiment.

The impact range information includes a table 800 of, for example, FIG. 7. The table 800 stores entries each including a module name 801 and an impact range 802.

The module name 801 is a field for storing a name (identification information) of the module including components to be subjected to an impact of a security risk. The impact range 802 is a field for storing names (identification information) of the components to be subjected to the impact of the security risk.

Figure 8B:
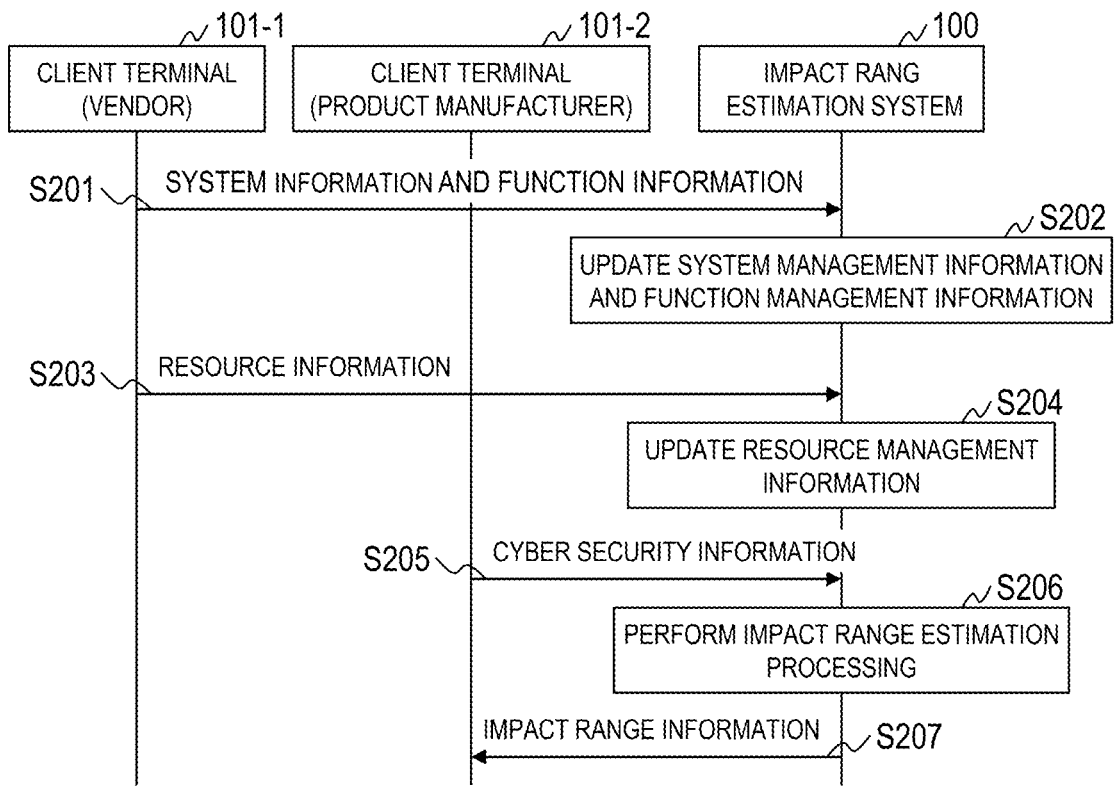
Figure 8C:
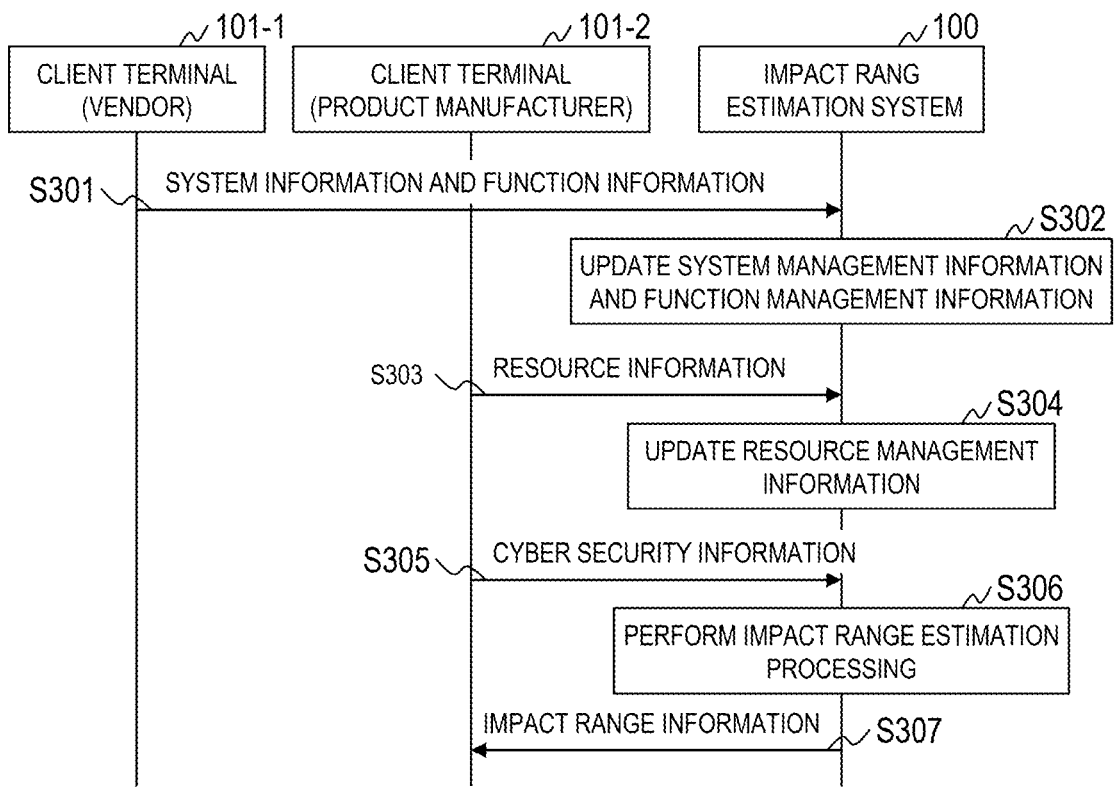

FIG. 8A, FIG. 8B, and FIG. 8C are sequence diagrams for illustrating examples of processing flows of the system according to the first embodiment.

In this embodiment, use cases in which a vendor and a product manufacturer use the impact range estimation system 100 are described as examples.

First, the use case illustrated in FIG. 8A is described. The vendor operates a client terminal 101-1 to transmit the product configuration system information 400 and the function information 500 on a product to the impact range estimation system 100 (Step S101).

In a case where the information obtaining module 110 of the impact range estimation system 100 receives the product configuration system information 400 and the function information 500, the information obtaining module 110 updates the product configuration system management information 131 and the function management information 132 (Step S102). Specifically, the information obtaining module 110 registers the product configuration system information 400 in the product configuration system management information 131, and registers the function information 500 in the function management information 132.

The vendor collects information on resources of components included in the product from the Web or the like, and operates the client terminal 101-1 to transmit the resource information 300 to the impact range estimation system 100 (Step S103).

In a case where the information obtaining module 110 of the impact range estimation system 100 receives the resource information 300, the information obtaining module 110 updates the resource management information 130 (Step S104). Specifically, the information obtaining module 110 registers the resource information 300 in the resource management information 130.

The vendor collects the cyber security information from the Web or the like, and operates the client terminal 101-1 to transmit the cyber security information to the impact range estimation system 100 (Step S105).

In a case where the impact range estimation system 100 receives the cyber security information, the impact range estimation system 100 executes impact range estimation processing (Step S106). The impact range estimation system 100 transmits the impact range information as a result of the processing to the client terminal 101-1 operated by the vendor (Step S107). The impact range estimation processing is executed for each product handled by the vendor.

The vendor operates the client terminal 101-1 to generate a report through use of the impact range information (Step S108), and transmits the report to a client terminal 101-2 operated by the product manufacturer (Step S109). The client terminal 101-1 is not required to be used for generating the report.

The use case illustrated in FIG. 8B is described. The vendor operates the client terminal 101-1 to transmit the product configuration system information 400 and the function information 500 on a product to the impact range estimation system 100 (Step S201).

In a case where the information obtaining module 110 of the impact range estimation system 100 receives the product configuration system information 400 and the function information 500, the information obtaining module 110 updates the product configuration system management information 131 and the function management information 132 (Step S202).

The vendor collects information on resources of components which form the product from the Web or the like, and operates the client terminal 101-1 to transmit the resource information 300 to the impact range estimation system 100 (Step S203).

In a case where the information obtaining module 110 of the impact range estimation system 100 receives the resource information 300, the information obtaining module 110 updates the resource management information 130 (Step S204).

The product manufacturer collects the cyber security information from the Web or the like, and operates the client terminal 101-2 to transmit the cyber security information to the impact range estimation system 100 (Step S205).

In a case where the impact range estimation system 100 receives the cyber security information, the impact range estimation system 100 executes impact range estimation processing (Step S206). The impact range estimation system 100 transmits the impact range information as a result of the processing to the client terminal 101-2 operated by the product manufacturer (Step S207). The impact range estimation processing is executed for all the products.

The use case illustrated in FIG. 8C is described. The vendor operates the client terminal 101-1 to transmit the product configuration system information 400 and the function information 500 on a product to the impact range estimation system 100 (Step S301).

In a case where the information obtaining module 110 of the impact range estimation system 100 receives the product configuration system information 400 and the function information 500, the information obtaining module 110 updates the product configuration system management information 131 and the function management information 132 (Step S302).

The product manufacturer collects information on resources of components which form the product produced by itself, and operates the client terminal 101-2 to transmit the resource information 300 to the impact range estimation system 100 (Step S303).

In a case where the information obtaining module 110 of the impact range estimation system 100 receives the resource information 300, the information obtaining module 110 updates the resource management information 130 (Step S304).

The product manufacturer collects the cyber security information from the Web or the like, and operates the client terminal 101-2 to transmit the cyber security information to the impact range estimation system 100 (Step S305).

In a case where the impact range estimation system 100 receives the cyber security information, the impact range estimation system 100 executes impact range estimation processing (Step S306). The impact range estimation system 100 transmits the impact range information as a result of the processing to the client terminal 101-2 operated by the product manufacturer (Step S307). The impact range estimation processing is executed for all the products.

Figure 9:
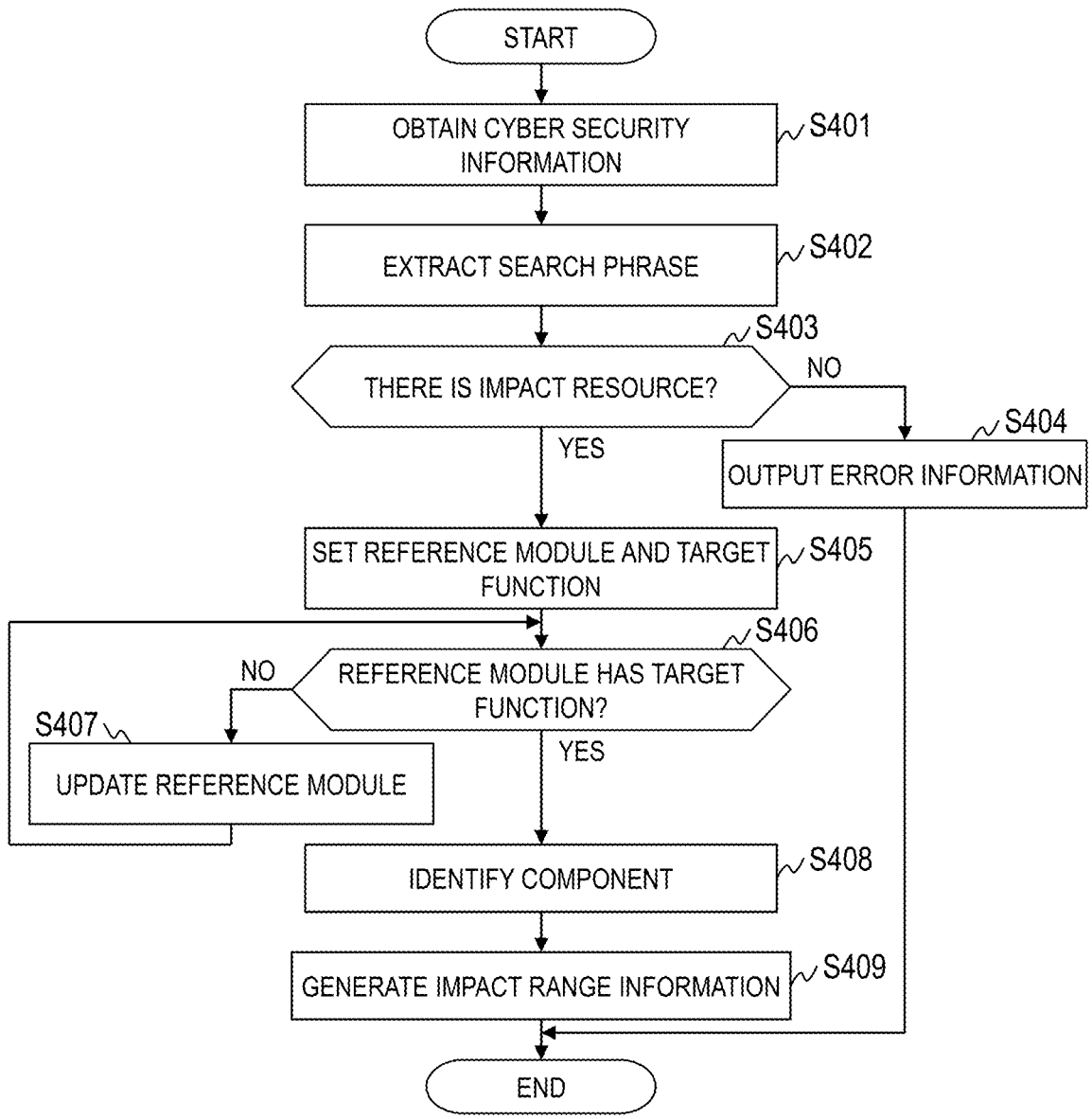
FIG. 9 is a flowchart for illustrating an example of impact range estimation processing executed by the impact range estimation system according to the first embodiment.

FIG. 9 is a flowchart for illustrating an example of the impact range estimation processing executed by the impact range estimation system 100 according to the first embodiment. In this case, it is assumed that the number of subject products is one.

The information extraction module 111 obtains the cyber security information received by the information obtaining module 110 (Step S401).

The information extraction module 111 extracts information on the security risk from the cyber security information, and extracts a search key from the extracted information (Step S402). In this embodiment, it is assumed that a search key indicating a resource is extracted from the cyber security information. As a method of extracting a term from a document, it is only required to use a publicly-known method, and hence a detailed description thereof is omitted.

The function determination module 120 of the impact range estimation module determines whether or not there is a resource (impact resource) to be subjected to an impact of the security risk based on the search key (Step S403).

Specifically, the function determination module 120 refers to the resource information 300 on the product to search for an entry in which the resource 303 has a value matching the search key. In a case where the above-mentioned entry is hit, the function determination module 120 determines that there is an impact resource.

In a case where it is determined that there is no impact resource, the impact range estimation module 112 transmits the error information to the client terminal 101 (Step S404), and finishes the impact range estimation processing. For example, it is conceivable to transmit error information indicating that there is no relevant resource or error information which prompts review of components and the like relevant to the resource.

In a case where it is determined that there is an impact resource, the function determination module 120 of the impact range estimation module 112 sets a reference module and a target function (Step S405).

Specifically, the function determination module 120 sets, as the target function, a function corresponding to the function 302 of the retrieved entry. The function determination module 120 further refers to the product configuration system information to search for an entry in which a value of the component name 301 of the retrieved entry is set in the class name 401. The function determination module 120 determines, as a reference module, a module corresponding to the class name (parent) 402 of the retrieved entry.

The search module 121 of the impact range estimation module 112 determines whether or not the reference module has the target function (Step S406).

Specifically, the search module 121 refers to the function information 500 to search for an entry in which the name of the reference module is set in the class name 501, and obtains a value of the function 502 of the retrieved entry. Thus, it is possible to recognize functions of the reference module. The search module 121 determines whether or not the target function is included in the functions of the reference module. In a case where the target function is included in the functions of the reference module, the search module 121 determines that the reference module has the target function.

In a case where it is determined that the reference module does not have the target function, the search module 121 of the impact range estimation module 112 updates the reference module (Step S407), and the process returns to Step S406.

Specifically, the search module 121 refers to the product configuration system information 400 to search for an entry in which a value of the reference module is set in the class name 401. The function determination module 120 sets, as a new reference module, a module corresponding to the class name (parent) 402 of the retrieved entry.

The processing steps of Step S406 and Step S407 correspond to processing for searching inheritance relationships of a tree structure in a direction from a lower layer to an upper layer with a starting point being set to a module having an inheritance relationship with a component having a function implemented by the impact resource.

In a case where it is determined that the reference module has the target function, the search module 121 of the impact range estimation module 112 identifies the component by referring to the product configuration system information 400 based on the reference module (Step S408).

Specifically, the search module 121 identifies a component by searching the inheritance relationships of the tree structure in a direction from the upper layer to the lower layer with a starting point being set to the reference module.

The impact range estimation module 112 generates impact range information based on the identified component (Step S409), and finishes the impact range estimation processing.

Figure 10:
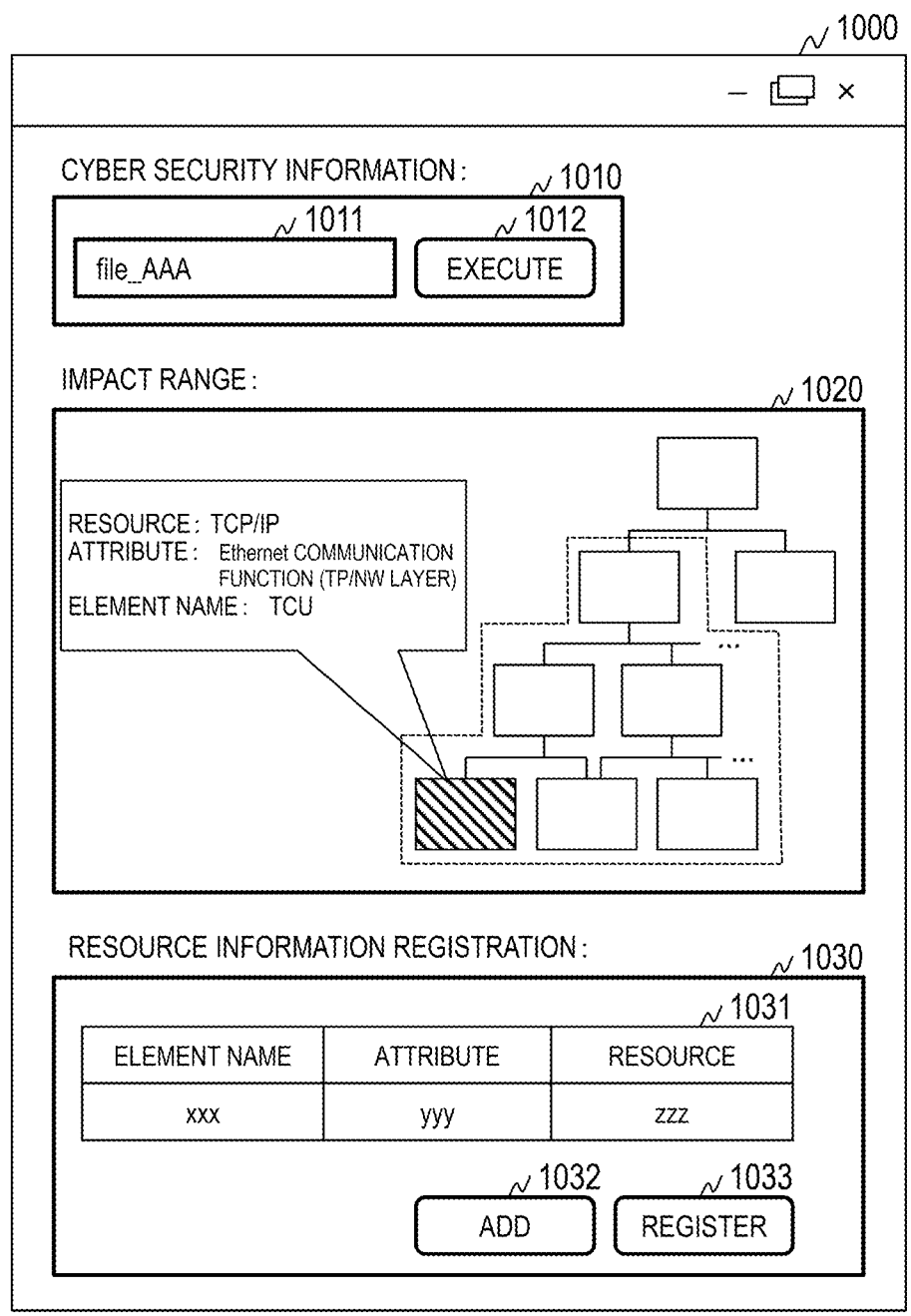
FIG. 10 is a view for illustrating an example of a screen displayed on a client terminal in the first embodiment.

FIG. 10 is a view for illustrating an example of a screen displayed on the client terminal 101 in the first embodiment.

On the client terminal 101, a screen 1000 of FIG. 10 is displayed. The screen includes a cyber security information field 1010, an impact range field 1020, and a resource information field 1030.

The cyber security information field 1010 is a field for selecting the cyber security information and issuing an instruction to execute the impact range estimation processing, and includes an input field 1011 and an execute button 1012. The input field 1011 is a field for inputting the cyber security information. In the input field 1011, for example, a file or text is input. The execute button 1012 is an operation button for instructing execution of the impact range estimation processing.

The impact range field 1020 is a field for displaying a result of the impact range estimation processing, such as the impact range information. In FIG. 10, a tree structure on which the impact range of the product is superimposed is displayed. A box indicated by diagonal lines represents a component provided with the impact resource, and an area indicated by broken lines represents the search range with the starting point being set to the module having the target function. For the box corresponding to the component provided with the impact resource, the result of the search performed in Step S403 is superimposed and displayed.

The resource information field 1030 is a field for a user who has referred to the impact range field 1020 to newly register the resource information 300, and includes an addition table 1031, an add button 1032, and a register button 1033. The addition table is a table for setting information for registration as the resource information 300. The add button 1032 is an operation button for adding an entry to the addition table 1031. The register button 1033 is an operation button for registering content of the addition table 1031.

A user such as a vendor can add and update the resource information by referring to the impact range information and the like. Accordingly, it is possible to increase estimation accuracy of the impact range of the product and to speed up estimation processing.

(Conclusion) In the related art, in order to identify a component to be subjected to the impact of the security risk of a resource, it has been required to completely recognize the relationship between the resource and the component. In contrast, according to this invention, when the relationship between the resource and the component is partially recognized, it is possible to identify the component to be subjected to the impact of the security risk of the resource.

This invention is not limited to the above-mentioned embodiment, and includes various modification examples. Further, for example, in the above-mentioned embodiment, the configurations are described in detail in order to clearly describe this invention, but this invention is not necessarily limited to an embodiment that includes all the configurations that have been described. Further, another configuration can be added to, deleted from, and replace a part of the configuration of the embodiment.

Further, in regard to each of the above-mentioned configurations, components, functions, processing modules, processing means, and the like, a part thereof or an entirety thereof may be implemented by hardware, for example, by being designed as an integrated circuit. Moreover, this invention can be achieved by program code of software which implements the functions of the embodiment. In this case, a storage medium in which the program code is recorded is provided to a computer, and a processor included in the computer reads out the program code stored in the storage medium. In this case, the program code itself read out from the storage medium implements the above-mentioned functions of the embodiment, and the program code itself and the storage medium storing the program code constitute this invention. As such a storage medium for supplying the program code, for example, a flexible disk, a CD-ROM, a DVD-ROM, a hard disk drive, a solid state drive (SSD), an optical disc, a magneto-optical disk, a CD-R, a magnetic tape, a non-volatility memory card, or a ROM is used.

Moreover, the program code for implementing the functions described in this embodiment can be implemented in a wide range of programs or script languages, for example, an assembler, C/C++, Perl, Shell, PHP, Python, and Java.

Moreover, the program code of the software for implementing the functions of the embodiment may be distributed through a network, to thereby store the program code in storage means such as a hard disk or a memory of a computer or a storage medium such as a CD-RW or a CD-R, and the processor included in the computer may read out and execute the program code stored in the storage means or the storage medium. The program may be loaded from an external device including a non-transitory storage device through a network, or may be loaded through a non-transitory storage medium.

In the above-mentioned embodiment, control lines and information lines that are assumed to be required for the sake of description are illustrated, but not all the control lines and the information lines on a product are illustrated. All the components may be connected to one another.

What is claimed is:

1. A computer system, comprising at least one computer including a processor and a storage device,
   the computer system holding:
   function information for managing function of each of a plurality of modules which form a product;
   resource information for managing a resource which implements the function of each of a plurality of components that form a module; and product configuration system information for managing a system of the plurality of modules and relationships between the plurality of modules and the plurality of components, the function information storing only data relating to some of the plurality of components, or data relating to at least one of the plurality of components is incomplete, and the at least one computer being configured to:

obtain cyber security information on a target resource having a security risk;

identify, based on the resource information, a target component provided with a target function implemented through use of the target resource;

identify, based on the product configuration system information and the function information, a target module provided with the target function with a starting point being set to one of the plurality of modules which is provided with the target component;

identify, based on the product configuration system information, each of the plurality of components which relates to the target module; and generate and output impact range information for presenting the each of the plurality of components which has been identified.

2. The computer system according to claim 1, wherein the product configuration system information includes information which defines inheritance relationships in which the plurality of modules and the plurality of components are set as object-oriented classes, wherein the classes of the plurality of modules form inheritance relationships of a tree structure, wherein the classes of the plurality of components form inheritance relationships with the classes of the plurality of modules so as to become leaf nodes of the inheritance relationships of the tree structure, and wherein the at least one computer is configured to:

identify the target module by searching the inheritance relationships of the tree structure in a direction from a lower layer to an upper layer with a starting point being set to one of the plurality of modules which has an inheritance relationship with the target component; and identify the each of the plurality of components which relates to the target module by searching the inheritance relationships of the tree structure in a direction from the upper layer to the lower layer with a starting point being set to the target module.

3. The computer system according to claim 2, wherein the at least one computer is configured to present a screen which displays the impact range information, and wherein the screen includes an input field for adding new data to the resource information.

4. An analysis method for an impact of a security risk, which is executed by a computer system, the computer system including at least one computer including a processor and a storage device, the computer system holding:

function information for managing function of each of a plurality of modules which form a product;

resource information for managing a resource which implements the function of each of a plurality of components that form a module; and product configuration system information for managing a system of the plurality of modules and relationships between the plurality of modules and the plurality of components, the function information storing only data relating to some of the components, or data relating to at least one of the components being incomplete, the analysis method for an impact of a security risk including:

a first step of obtaining, by the at least one computer, cyber security information on a target resource having a security risk;

a second step of identifying, by the at least one computer, based on the resource information, a target component provided with a target function implemented through use of the target resource;

a third step of identifying, by the at least one computer, based on the product configuration system information and the function information, a target module provided with the target function with a starting point being set to one of the plurality of modules which is provided with the target component;

a fourth step of identifying, by the at least one computer, based on the product configuration system information, each of the plurality of components which relates to the target module; and a fifth step of generating and outputting, by the at least one computer, impact range information for presenting the each of the plurality of components which has been identified.

5. The analysis method for an impact of a security risk according to claim 4, wherein the product configuration system information includes information which defines inheritance relationships in which the plurality of modules and the plurality of components are set as object-oriented classes, wherein the classes of the plurality of modules form inheritance relationships of a tree structure, wherein the classes of the plurality of components form inheritance relationships with the classes of the plurality of modules so as to become leaf nodes of the inheritance relationships of the tree structure, wherein the third step includes a step of identifying, by the at least one computer, the target module by searching the inheritance relationships of the tree structure in a direction from a lower layer to an upper layer with a starting point being set to one of the plurality of modules which has an inheritance relationship with the target component; and wherein the fourth step includes a step of identifying, by the at least one computer, the each of the plurality of components which relates to the target module by searching the inheritance relationships of the tree structure in a direction from the upper layer to the lower layer with a starting point being set to the target module.

6. The analysis method for an impact of a security risk according to claim 5, wherein the fifth step includes a step of presenting, by the at least one computer, a screen which displays the impact range information, and wherein the screen includes an input field for adding new data to the resource information.

* * * * *